March 25, 1969    A. E. HORMAN    3,434,603
LOADING MACHINE
Filed Dec. 27, 1965
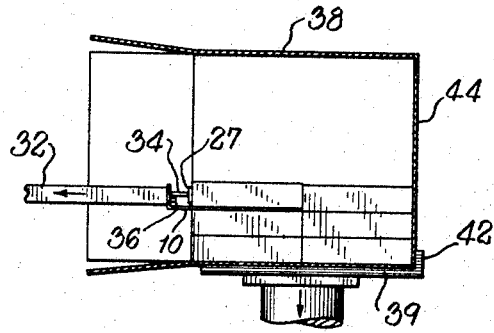
Fig.5.
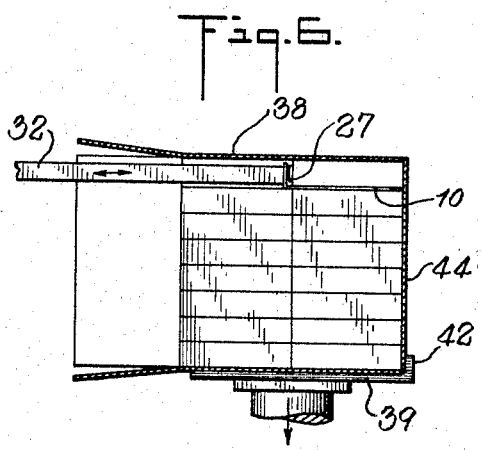
Fig.6.
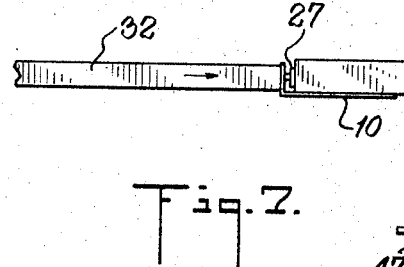
Fig.7.
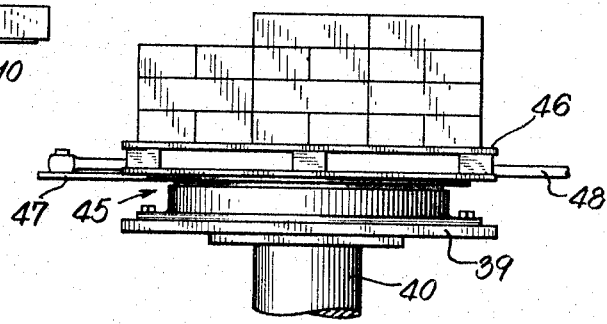
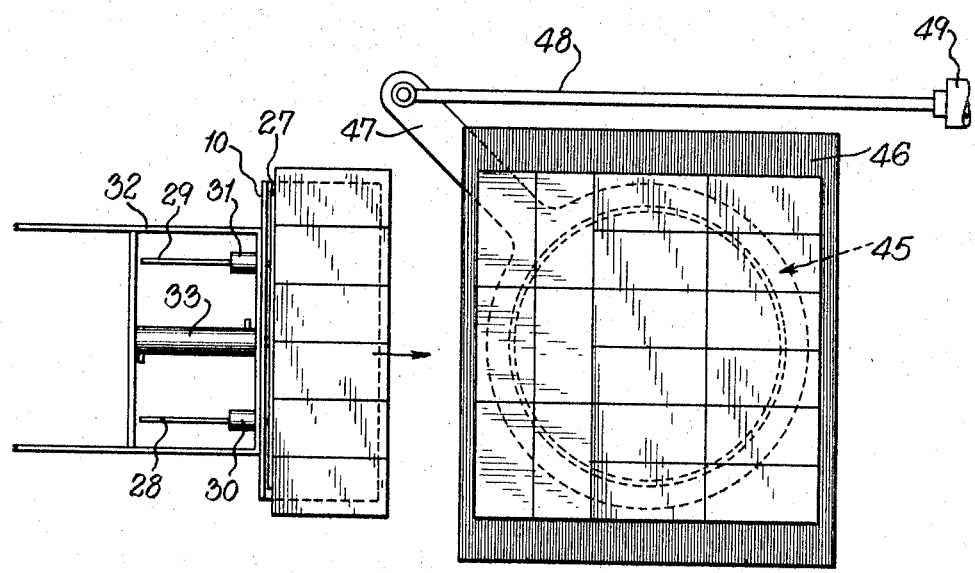
Fig.8.
INVENTOR
ALFRED E. HORMAN
BY
Byerly, Townsend, Watson & Churchill
ATTORNEYS United States Patent Office 3,434,603
Patented Mar. 25, 1969

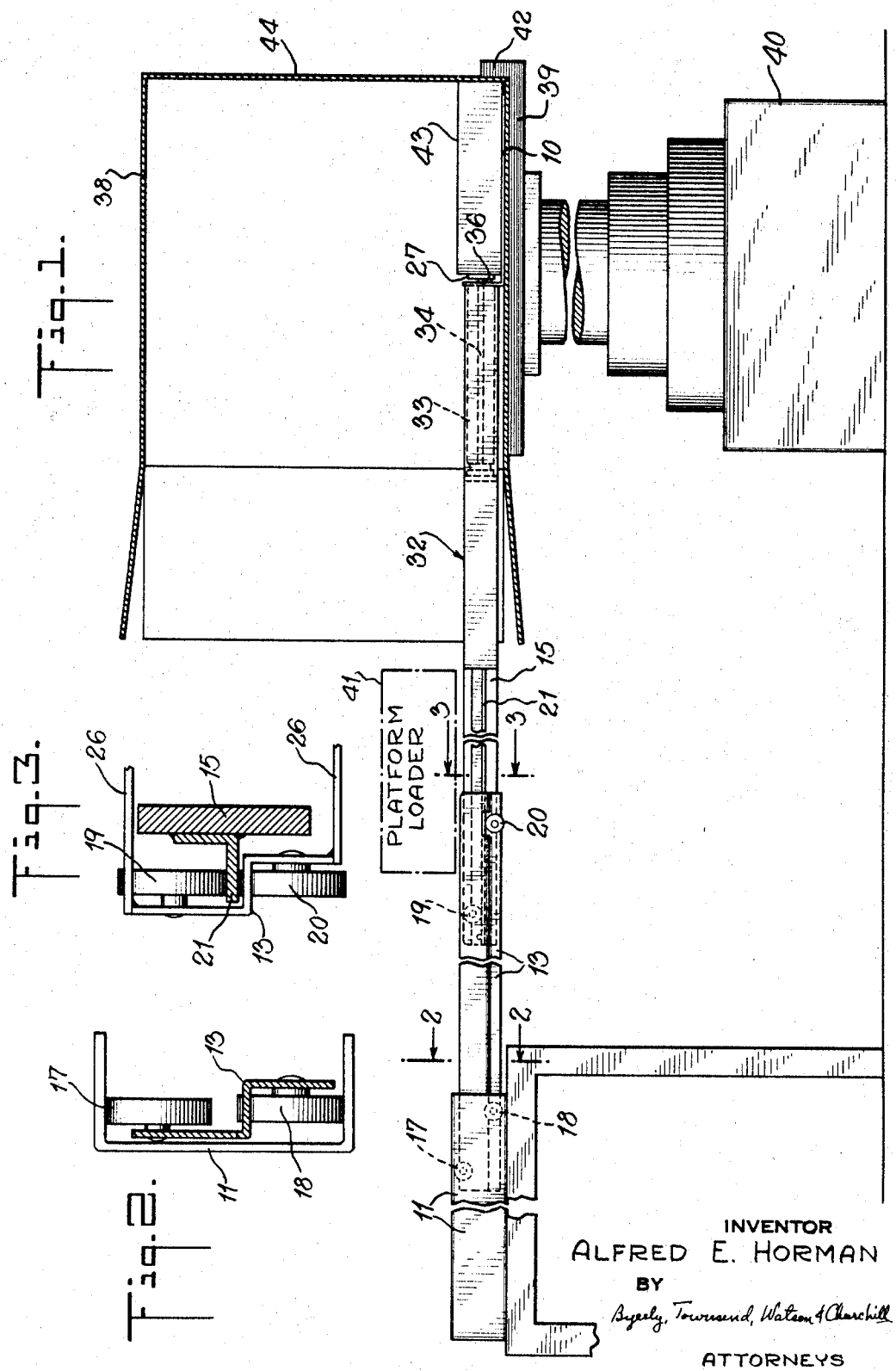

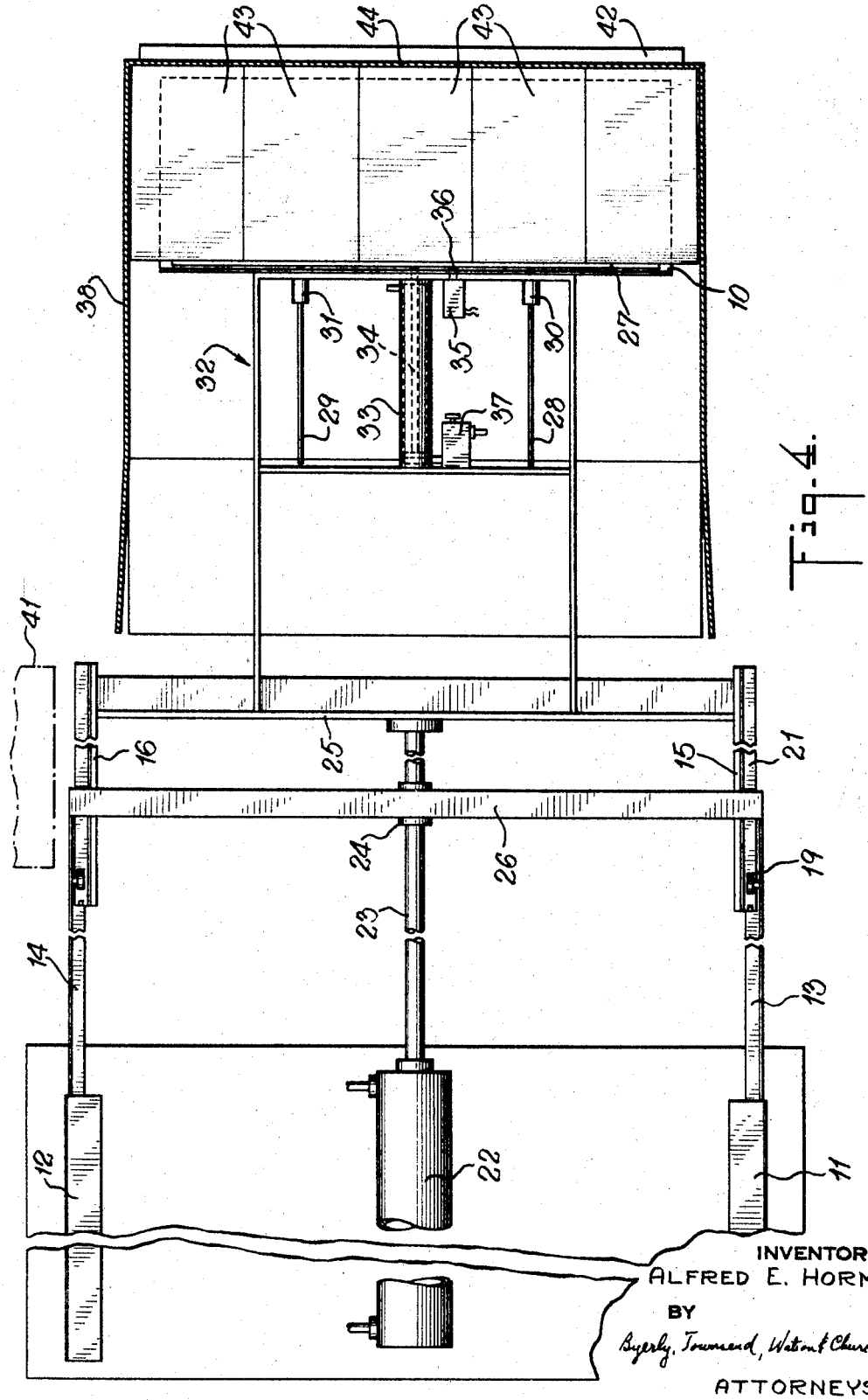

3,434,603
LOADING MACHINE
Alfred E. Horman, New York, N.Y., assignor to Palletizer Corporation, New York, N.Y., a corporation of New York
Filed Dec. 27, 1965, Ser. No. 516,586
Int. Cl. B65g 57/10, 57/20
U.S. Cl. 214—6                           7 Claims

ABSTRACT OF THE DISCLOSURE

In a loading machine of the type which assembles a plurality of identical units and stacks them in rows within a carton or container, a loading platform of thin silhouette is cantilevered at the outer ends of extensible and retractable arms so that the platform can be thrust into and withdrawn from the open mouth of the carton; a stripper bar is mounted for reciprocal movement across the upper face of the loading platform so that a block of identical units is unloaded along a line inside the carton; and units are stacked inside the carton by automatically regulating the positions at which the platform enters the carton and is unloaded so that a plurality of blocks of units is deposited on a series of contiguous load-receiving stations.

---

The present invention relates to a loading machine and more particularly to a machine for forming a block from a plurality of identical objects or units.

In my Patent No. 2,768,756 there is described a loading machine particularly suited for loading pallets or the like. A line of two or more cases of bottled beverage or the like is formed on a transfer carriage and then shifted to one of a plurality of loading stations over the pallet whereupon the line is stripped from the carriage. The carriage is suspended from overhead rails. A two-stroke piston system moves the carriage while a second piston arrangement, disposed adjacent the first system and having an equally long stroke, operates a stripper bar. While the foregoing apparatus works well in loading a pallet with cases it has certain limitations. One of these is an inability to load units into a space defined by a closely fitting enclosure such as involved in the loading of shipping cartons.

It is, therefore, an object of the present invention to provide a loading machine which is capable of working within a confined space and can be employed to load a carton or container.

A further purpose of the present invention is to simplify the operating mechanism as well as the controls therefor.

A still further purpose is to extend the usefulness of the machine by enabling it to stack bricks or other objects in which each course or tier is disposed at right angles to the tier below, thereby providing an interlocking block.

The invention will be better understood after reading the following detailed description of certain presently preferred embodiments thereof with reference to the appended drawings in which:

FIGURE 1 is an elevational view of the loading machine arranged for loading a carton with smaller boxes or the like, FIGURE 2 is a sectional view taken along line 2—2 in FIGURE 1, FIGURE 3 is a sectional view taken along line 3—3 in FIGURE 1, FIGURE 4 is a top plan view of the loading machine in FIGURE 1, FIGURE 5 is a fragmentary view showing a step in the loading operation, FIGURE 6 is a view similar to FIGURE 5 showing a later step in the loading operation, FIGURE 7 is a fragmentary view of a modification of the invention adapted to the loading of bricks upon a pallet, and FIGURE 8 is a top plan view of the embodiment shown in FIGURE 7.

Reference should now be had to FIGURES 1 to 6 of the drawings wherein like reference numerals are used throughout to designate the same part or parts.

A platform 10 of thin silhouette for supporting a line of boxes or units is cantilevered at the end of extensible arm means consisting of a pair of stationary channels 11 and 12, a pair of intermediate rails 13 and 14 riding, respectively, in channels 11 and 12, and a pair of inner rails 15 and 16 riding on rails 13 and 14, respectively.

Intermediate rail 13, for example, has mounted thereon the rollers 17, 18, 19 and 20. As best seen in FIGURES 1 and 2, the rollers 17 and 18 engage the opposing flanges of channel 11 thereby positioning rail 13. FIGURES 1 and 3 most clearly illustrate the function of rollers 19 and 20 in supporting the inner rail 15 by its flange member 21. It will be understood that the rails 14 and 16 are similarly supported in channel 12 and that the assembly constitutes a typical extensible arm mechanism capable of horizontal extension with a minimum of vertical deflection.

A double acting fluid actuated piston assembly 22 is mounted between the fixed rails 11 and 12 for manipulating the extensible arms. A piston rod 23, guided by a bushing 24 has its end joined to a cross brace 25 between the rails 15 and 16. The bushing 24 is supported by additional cross bracing 26 between the rails 13 and 14. See FIGURES 3 and 4.

The stripper bar is shown at 27. It is supported adjacent the supported side of platform 10 for reciprocal movement over the platform to the opposite side for unloading a line of the units, here shown as a plurality of boxes. The means for supporting the stripper bar 27 includes a plurality of laterally spaced and parallel elongated members or rods 28 and 29 extending from the rear of the stripper bar normal thereto and having a length in excess of the travel of the stripper bar relative to the platform. A series of guides or bushings 30 and 31 are carried by the frame 32 which joins platform 10 to the end of the extensible arms, and are thereby carried by the arms for supporting and guiding the members 28 and 29, respectively, for longitudinal horizontal movement relative thereto.

A fluid actuated piston assembly 33 is also mounted on the extensible arms by means of frame 32 directly behind the platform 10 and has its piston rod 34 coupled to the bar 27.

A limit switch 35 is also mounted on frame 32 directly behind the platform 10 and has its actuating element 36 positioned directly behind the stripper bar 27. As seen in FIGURES 1 and 4, the stripper bar 27 is in its home position at the cantilevered side of platform 10. The bar 27 is free to move rearwardly so as to actuate the limit switch when a force is exerted thereon relative to the frame 32. The limit switch is connected to the control circuit (not shown) for the piston assembly 22 for a purpose to be described below.

Also for a purpose to be described, an adjustable fluid pressure regulator 37 is connected in series with the fluid supply to piston assembly 33.

In the present example the loading machine is shown arranged to load boxes into a carton or container 38 which, in turn, is supported on a platform 39 of an elevator device 40.

In operation, the extensible arms are retracted so as to position the platform 10 at a home position in front of a conveyor or other platform loader 41. A line of boxes (not shown), previously formed, is transferred to the platform 10. The piston assembly 22 is actuated, thereby moving the platform with its load of boxes into the carton which is held on the elevator platform 39 by reason of a flange or lip 42. It will be seen from FIGURE 1 that the length of the platform 10 from its cantilevered side to its opposite side is less than the corresponding dimension of the line of units or boxes 43 such that the leading side of the units 43 will encounter any obstruction in its path. Thus, as the platform 10 is being advanced into the carton 38 the units 43 will encounter the carton wall 44. Further movement of the platform 10 causes the units 43 to be pressed against the stripper bar 27 thereby actuating limit switch 35 and halting operation of the piston assembly 22.

A sequencing system, not shown, but whose construction will be well understood, now energizes piston assembly 22 to retract the extensible arms and platform 10. Simultaneously, fluid under pressure is supplied to piston assembly 33 through pressure regulator 37 tending to extend the piston rod 34 and push or strip the units 43 from the platform 10. The pressure regulator should be adjusted beforehand to regulate the pressure of the fluid supplied to piston assembly 33 such that it just overcomes the friction forces between the line of units 43 and the platform 10. In this manner the units 43 will not be pushed too forcefully against the wall 44 of the carton 38, the force accommodating itself automatically to the rearward movement of platform 10. In known manner the operation of piston assembly 33 can be reversed to return stripper bar 27 to its home position when platform 10 has been retracted sufficiently to drop its load in place.

When platform 10 is returned to its home position it receives another line of boxes. Sequencing circuitry then advances the platform 10 until the second line of boxes encounters the initial line 43 already in the carton, whereupon, through the action of limit switch 35 the operation is reversed to unload the second line.

In the present example two lines are deposited in each tier. That is, there are two contiguous load-receiving stations. A counting mechanism actuates elevator device 40 to index it downward a distance equal to the height of a unit box after the second station or position is loaded and as the platform 10 is being returned to its home position. Then two more lines are loaded in similar fashion to the first two, the elevator indexes down another step, and so on.

FIGURE 5 shows the platform 10 commencing to withdraw after placing the second line in the third tier, the stripper bar being extended to maintain the line on the platform in contact with the line in front of it.

FIGURE 6 shows the next to last line being placed in the carton. This figure points up a feature of the invention; that is, the height above the platform 10 of all of the structure associated therewith and which enters the confines of the space in which the block of boxes is to be formed is no greater than the height of one box or unit. The structure involved is the frame 32 and everything mounted thereon. As a result, the carton or enclosure can be filled completely and compactly.

The stacking of certain articles such as bricks or building blocks requires the use of an interlocking loading pattern to assure stability of the block. FIGURES 7 and 8 illustrate a modification of the invention showing how this can be accomplished. The apparatus is the same as that previously described except for the omission of limit switch 35 and pressure regulator 37, and the addition of the structure to be described.

A turntable 45 is mounted on the platform 39 of the elevator device 40 to support a removable pallet 46 on which the units are stacked. Turntable 45 is provided with any well understood mechanism for indexing it through 90°. As one example there is shown a lever arm 47, a connecting rod 48 and a fluid powered actuator 49. It should be evident that this mechanism will be mounted to travel up and down with the indexing of elevator 40. Also, its operation will be synchronized in known manner with the indexing of elevator device 40 to shift the turntable alternately forward and backward 90° with alternate steps in the downward movement of the elevator device 40.

It should be evident that the turntable 45 may be located beneath the elevator device causing it to rotate along with the pallet and load.

Due to the weight and frictional characteristics of the load it may be preferable to replace the limit switch and pressure regulator control of stripper bar 27 and platform 10 by a programming arrangement based upon position control such as that described in the above mentioned patent. A programming arrangement could also be used, if desired, in the embodiment of FIGURE 1.

Having described the presently preferred embodiments of the invention it will be understood by those skilled in the art that various changes can be made in the details of construction without departing from the true spirit of the invention.

What is claimed is:

1. In a loading machine of the type which assembles a plurality of identical units to be loaded in a series of lines and transfers each line of units as a group to a different one of a plurality of contiguous load receiving stations for stacking said units in a block, the improvement which comprises a platform of thin silhouette cantilevered at the end of extensible arm means for supporting said line of units, the opposite end of said arm means being supported in fixed position, means for extending and retracting said extensible arm means so that said platform reciprocates along a horizontal plane entering the confines of the space in which said block is to be formed, a stripper bar, means for supporting said stripper bar adjacent the supported side of said platform for reciprocal movement over the platform to the opposite side for unloading a line of said units from said opposite side comprising a plurality of laterally spaced and parallel elongated members extending from the rear of said stripper bar normal thereto and having a length in excess of the travel of said stripper bar relative to said platform and means carried by said extensible arm means for supporting and guiding said members for longitudinal horizontal movement relative thereto, the height above said platform of all of the structure associated therewith and which enters the confines of the space in which said block is to be formed being no greater than the height of one of said units, whereby said block of units can be formed within a closely confining enclosure.

2. A loading machine according to claim 1, wherein the means for reciprocating said stripper bar comprises a fluid actuated piston assembly mounted on said extensible arm means directly behind said platform and coupled to said stripper bar.

3. A loading machine according to claim 2, wherein the means for extending and retracting said extensible arm means is constructed and arranged to extend said arm means from a home position to a plurality of more or less distant positions and for retracting the same to said home position to thereby position said platform at a more or less distant load receiving station after receiving a line of units at said home position, and means are provided for actuating said piston assembly as said extensible arm means is being retracted to strip a line of units from said platform.

4. A loading machine according to claim 3, wherein an elevator device is disposed below the load receiving stations for permitting said units to be deposited in tiers as the device indexes downward successive distances equal to the height of a single unit.

5. A loading machine according to claim 4, wherein a turntable is coupled with said elevator device for rotating the units disposed thereon, and means are coupled to said turntable for indexing it 90° each time said elevator device indexes to another level.

6. In a loading machine of the type which assembles a plurality of identical units to be loaded in a seires of lines and transfers each line of units as a group to a different one of a plurality of contiguous load receiving stations for stacking said units in a block, the improvement which comprises a platform of thin silhouette cantilevered at the end of extensible arm means for supporting said line of units, the opposite end of said arm means being supported in fixed position, means for extending and retracting said extensible arm means so that said platform reciprocates along a horizontal plane, the length of the platform from its cantilevered side to its opposite side being less than the corresponding dimension of the line of units such that upon extension of the extensible arm means the leading side of said units will encounter any obstruction in its path, a stripper bar, means supporting said stripper bar adjacent the supported side of said platform for reciprocal movement over the platform to the opposite side for unloading a line of said units from its opposite side, means carried by said extensible arm means adjacent said platform for reciprocating said stripper bar, a limit switch carried by said extensible arm means adjacent the cantilevered side of said platform so as to be actuated by rearward movement of the stripper bar beyond its home position of the cantilevered side of the platform, and means coupling said limit switch to the means for extending and retracting said extensible arm means for halting the extension thereof when the units on the platform encounter an obstruction.

7. In a loading machine of the type which assembles a plurality of identical units to be loaded in a series of lines and transfers each line of units as a group to a different one of a plurality of contiguous load receiving stations for stacking said units in a block, the improvement which comprises a platform of thin silhouette cantilevered at the end of extensible arm means for supporting said line of units, the opposite end of said arm means being supported in fixed position, means for extending and retracting said extensible arm means so that said platform reciprocates along a horizontal plane, a stripper bar, means supporting said stripper bar adjacent the supported side of said platform for reciprocal movement over the platform to the opposite side for unloading a line of said units from said opposite side, and means carried by said extensible arm means adjacent said platform for reciprocating said stripper bar comprising a fluid actuated piston assembly mounted on said extensible arm means directly behind said platform and coupled to said stripper bar, and an adjustable pressure regulator coupled to said piston assembly for regulating the fluid pressure supplied thereto on the stripping stroke such that it just overcomes the friction forces between the line of units and the platform.

References Cited

UNITED STATES PATENTS

| | | | |
|---|---|---|---|
| 817,375 | 4/1906 | Keyes | 214—6 |
| 1,269,115 | 6/1918 | Reese | 53—162 |
| 2,768,756 | 10/1956 | Horman | 214—6 |
| 2,870,922 | 1/1959 | Thomson | 214—6 |
| 2,883,074 | 4/1959 | Boehl et al. | 214—6 |
| 2,977,002 | 3/1961 | Asp | 214—6 |

FOREIGN PATENTS

| | | |
|---|---|---|
| 194,745 | 2/1965 | Sweden. |

GERALD M. FORLENZA, *Primary Examiner.*

F. E. WERNER, *Assistant Examiner.*

U.S. Cl. X.R.

53—162